United States Patent
Chuang et al.

(10) Patent No.: US 10,897,631 B2
(45) Date of Patent: *Jan. 19, 2021

(54) METHODS OF CONSTRAINED INTRA BLOCK COPY FOR REDUCING WORST CASE BANDWIDTH IN VIDEO CODING

(71) Applicant: MEDIATEK INC., Hsinchu (TW)

(72) Inventors: Tzu-Der Chuang, Zhubei (TW); Shan Liu, San Jose, CA (US); Xiaozhong Xu, State College, PA (US)

(73) Assignee: MEDIATEK INC., Hsinchu (TW)

( * ) Notice: Subject to any disclaimer, the term of this patent is extended or adjusted under 35 U.S.C. 154(b) by 0 days.

This patent is subject to a terminal disclaimer.

(21) Appl. No.: 16/540,141

(22) Filed: Aug. 14, 2019

(65) Prior Publication Data

US 2019/0373286 A1    Dec. 5, 2019

Related U.S. Application Data

(63) Continuation of application No. 15/564,205, filed as application No. PCT/CN2016/079191 on Apr. 13, 2016, now Pat. No. 10,432,966.

(Continued)

(51) Int. Cl.
*H04N 19/593* (2014.01)
*H04N 19/176* (2014.01)
(Continued)

(52) U.S. Cl.
CPC ......... *H04N 19/593* (2014.11); *H04N 19/105* (2014.11); *H04N 19/11* (2014.11);
(Continued)

(58) Field of Classification Search
CPC ...... H04N 19/593; H04N 19/70; H04N 19/11; H04N 19/105; H04N 19/159; H04N 19/176; H04N 19/51
(Continued)

(56) References Cited

U.S. PATENT DOCUMENTS

2014/0376634 A1* 12/2014 Guo ............... H04N 19/52
375/240.16
2015/0049813 A1    2/2015 Tabatabai et al.
(Continued)

FOREIGN PATENT DOCUMENTS

CA    2 912 447 A1    12/2014
WO    2015/031253 A1    3/2015
(Continued)

OTHER PUBLICATIONS

Pang, C., et al.; "Non-SCCE1 Memory bandwidth reduction for intra block copy;" Joint Collaborative Team on Video Coding (JCT-VC) of ITU-T SG 16 WP 3 and ISO/IEC JTC 1/SC 29/WG 11; Jun.-Jul. 2014; pp. 1-9.
(Continued)

*Primary Examiner* — Marnie A Matt
(74) *Attorney, Agent, or Firm* — McClure, Qualey & Rodack, LLP

(57) ABSTRACT

A method and apparatus for video coding operates by receiving input data associated with a current block in a current picture, determining restricted prediction based on whether IntraBC prediction (Intra Block Copy prediction) is included in a plurality of candidate coding modes, wherein said determining the restricted prediction comprising disabling or disallowing selected prediction for one or more selected PU (prediction unit) sizes, PU prediction types or both, and applying video coding to the current block using the candidate coding modes including IntraBC prediction (Intra Block Copy prediction) in accordance with the restricted prediction.

11 Claims, 3 Drawing Sheets

Related U.S. Application Data

(60) Provisional application No. 62/240,699, filed on Oct. 13, 2015, provisional application No. 62/237,717, filed on Oct. 6, 2015, provisional application No. 62/183,262, filed on Jun. 23, 2015, provisional application No. 62/160,831, filed on May 13, 2015, provisional application No. 62/146,533, filed on Apr. 13, 2015.

(51) Int. Cl.
*H04N 19/105* (2014.01)
*H04N 19/159* (2014.01)
*H04N 19/11* (2014.01)
*H04N 19/70* (2014.01)
*H04N 19/51* (2014.01)

(52) U.S. Cl.
CPC ......... *H04N 19/159* (2014.11); *H04N 19/176* (2014.11); *H04N 19/70* (2014.11); *H04N 19/51* (2014.11)

(58) Field of Classification Search
USPC .................................................. 375/240.12
See application file for complete search history.

(56) References Cited

U.S. PATENT DOCUMENTS

| | | | |
|---|---|---|---|
| 2015/0055703 A1* | 2/2015 | Pang | H04N 19/176 375/240.12 |
| 2015/0063440 A1 | 3/2015 | Pang et al. | |
| 2015/0071357 A1 | 3/2015 | Pang et al. | |
| 2015/0098504 A1 | 4/2015 | Pang et al. | |
| 2015/0312588 A1 | 10/2015 | Yamamoto et al. | |
| 2015/0373358 A1* | 12/2015 | Pang | H04N 19/174 375/240.12 |
| 2016/0227244 A1* | 8/2016 | Rosewarne | H04N 19/105 |
| 2016/0269737 A1 | 9/2016 | Sakakibara et al. | |
| 2017/0034526 A1 | 2/2017 | Rapaka et al. | |
| 2017/0374366 A1* | 12/2017 | Xiu | H04N 19/129 |

FOREIGN PATENT DOCUMENTS

| | | |
|---|---|---|
| WO | 2015/031806 A1 | 3/2015 |
| WO | 2015/035449 A1 | 3/2015 |

OTHER PUBLICATIONS

International Search Report dated Jul. 21, 2016, issued in application No. PCT/CN2016/079191.

Chuang, T.D., et al.; "Intra block copy constrains for non-444 video;" Joint Collaborative Team on Video Coding (JCT-VC) of ITU-T SG 16 WP 3 and ISO/IEC JTC 1/SC 29/WG 11; Oct. 2015; pp. 1-8.

Xu, X., et al.; "On instar block copy signaling and constrains;" Joint Collaborative Team on Video Coding (JCT-VC) of ITU-T SG 16 WP 3 and ISO/IEC JTC 1/SC 29/WG 11; Oct. 2015; pp. 1-6.

Chuang, T.D., et al.; "CE2-related Intra block copy searching constrains for reducing worst case bandwidth;" Joint Collaborative Team on Video Coding (JCT-VC) of ITU-T SG 16 WP 3 and ISO/IEC JTC 1/SC 29/WG 11; Jun. 2015; pp. 1-16.

* cited by examiner

METHODS OF CONSTRAINED INTRA BLOCK COPY FOR REDUCING WORST CASE BANDWIDTH IN VIDEO CODING

CROSS REFERENCE TO RELATED APPLICATIONS

The present invention is a Continuation of U.S. patent application Ser. No. 15/564,205, filed on Oct. 4, 2017, now U.S. Pat. No. 10,432,966, which is a National Phase of Application No. PCT/CN2016/079191, filed on Apr. 13, 2016, which claims priority to U.S. Provisional Patent Application, Ser. No. 62/146,533, filed on Apr. 13, 2015, U.S. Provisional Patent Application, Ser. No. 62/160,831, filed on May 13, 2015, U.S. Provisional Patent Application, Ser. No. 62/183,262, filed on Jun. 23, 2015, U.S. Provisional Patent Application, Ser. No. 62/237,717, filed on Oct. 6, 2015 and U.S. Provisional Patent Application, Ser. No. 62/240,699, filed on Oct. 13, 2015. The U.S. Provisional Patent Applications are hereby incorporated by reference in their entireties.

FIELD OF THE INVENTION

The present invention relates to Intra picture block copy (IntraBC or IBC) coding for video data. In particular, the present invention relates to various techniques for signalling, binarization and constraints of syntax elements associated with Intra picture block copy coding.

BACKGROUND AND RELATED ART

High Efficiency Video Coding (HEVC) is a new coding standard that has been developed in recent years. In the High Efficiency Video Coding (HEVC) system, the fixed-size macroblock of H.264/AVC is replaced by a flexible block, named coding unit (CU). Pixels in the CU share the same coding parameters to improve coding efficiency. A CU may begin with a largest CU (LCU), which is also referred as coded tree unit (CTU) in HEVC. In addition to the concept of coding unit, the concept of prediction unit (PU) is also introduced in HEVC. Once the splitting of CU hierarchical tree is done, each leaf CU is further split into one or more prediction units (PUs) according to prediction type and PU partition. HEVC also supports slice structure, where a picture is partitioned into slices and each slice may use its own coding parameters or configurations.

Along with the High Efficiency Video Coding (HEVC) standard development, the development of extensions of HEVC has also started. The HEVC extensions include range extensions (RExt) which target at non-4:2:0 colour formats, such as 4:2:2 and 4:4:4, and higher bit-depths video such as 12, 14 and 16 bits per sample. One of the likely applications utilizing RExt is screen sharing, over wired- or wireless-connection. Due to specific characteristics of screen contents, coding tools have been developed and demonstrate significant gains in coding efficiency In the current development of screen content coding for High Efficiency Video Coding (HEVC) standard, some tools have been adopted due to their improvements in coding efficiency for screen contents. For Intra blocks, Intra prediction according to the conventional approach is performed using prediction based on reconstructed pixels from neighbouring blocks. Intra prediction may select an Intra Mode from a set of Intra Modes, which include a vertical mode, horizontal mode and various angular prediction modes. For HEVC screen content coding, a new Intra coding mode, named Intra-block copy (IntraBC) has been used. The IntraBC technique that was originally proposed by Budagavi in *AHG8: Video coding using Intra motion compensation*, Joint Collaborative Team on Video Coding (JCT-VC) of ITU-T SG 16 WP 3 and ISO/IEC JTC 1/SC 29/WG 11, 13th Meeting: Incheon, KR, 18-26 Apr. 2013, Document: JCTVC-M0350 (hereinafter JCTVC-M0350). An example according to JCTVC-M0350 is shown in FIG. 1, where a current coding unit (CU, 110) is coded using Intra MC (motion compensation). The prediction block (120) is located from the current CU and a displacement vector (112). In this example, the search area is limited to the current CTU (coding tree unit), the left CTU and the left-left CTU. The prediction block is obtained from the already reconstructed region. Then, the displacement vector, also named block vector (BV), and residual for the current CU are coded. It is well known that the HEVC adopts CTU and CU block structure as basic units for coding video data. Each picture is divided into CTUs and each CTU is reclusively divided into CUs. During prediction phase, each CU may be divided into multiple blocks, named prediction units (PUs) for performing prediction process. After prediction residue is formed for each CU, the residue associated with each CU is divided into multiple blocks, named transform units (TUs) to apply transforms.

In JCTVC-M0350, the Intra MC is different from the motion compensation used for Inter prediction in at least the following areas:
MVs are restricted to be 1-D for Intra MC (i.e., either horizontal or vertical) while Inter prediction uses 2-D motion estimation.
Binarization is fixed length for Intra MC while Inter prediction uses exponential-Golomb.
Intra MC introduces a new syntax element to signal whether the MV is horizontal or vertical.

Based on JCTVC-M0350, some modifications are disclosed by Pang, et al. in *Non-RCE3: Intra Motion Compensation with 2-D MVs*, Joint Collaborative Team on Video Coding (JCT-VC) of ITU-T SG 16 WP 3 and ISO/IEC JTC 1/SC 29/WG 11, 14th Meeting: Vienna, AT, 25 Jul.-2 Aug. 2013, Document: JCTVC-N0256 (hereinafter JCTVC-N0256). Firstly, the Intra MC is extended to support 2-D MVs, so that both MV components can be non-zero at the same time. This provides more flexibility to Intra MC than the original approach, where the MV is restricted to be strictly horizontal or vertical.

In JCTVC-T1005 (Joshi, et al., *HEVC Screen Content Coding Draft Text* 3, Joint Collaborative Team on Video Coding (JCT-VC) of ITU-T SG 16 WP 3 and ISO/IEC JTC 1/SC 29/WG 11, 20th Meeting: Geneva, CH, 10-18 Feb. 2015, Document: JCTVC-T1005), the Intra block copy mode is harmonized with normal Inter mode. The reconstructed current picture before deblocking is inserted to the List_0 reference frame list as one of the reference frame. The Intra block copy mode is signalled by setting refIdx (i.e., reference picture index) to point to the reconstructed current picture. Therefore, for a current picture, two pictures are required to be output. One is the un-filtered picture (i.e., before deblocking), and the other is the filtered picture (i.e., after sample adaptive offset, SAO). In order to support the Intra block copy, the worst case bandwidth (BW) of screen content coding (SCC) is larger than HEVC and HEVC ReExt.

In JCTVC-T0045 (Lainema, et al., *AHG10: Memory bandwidth reduction for intra block copy*, Joint Collaborative Team on Video Coding (JCT-VC) of ITU-T SG 16 WP 3 and ISO/IEC JTC 1/SC 29/WG 11, 20th Meeting: Geneva, CH, 10-18 Feb. 2015, Document: JCTVC-T0045) and JCTVC-T0051(Laroche, et al., *AHG10: On IBC memory reduction*, Joint Collaborative Team on Video Coding (JCT-VC) of ITU-T SG 16 WP 3 and ISO/IEC JTC 1/SC 29/WG 11, 20th Meeting: Geneva, CH, 10-18 Feb. 2015, Document: JCTVC-T0051), a method is disclosed to signal a CTU-level flag to indicate whether the current CTU will be referred by the following blocks for Intra block copy mode. If the flag is 1, the deblocking and SAO of this CTU are disabled. This CTU can be used for Intra block copy mode. Otherwise, the deblocking and SAO are enabled for this CTU. In this case, the CTU cannot be used for Intra block copy mode for the following blocks. Therefore, only one kind of CTU needs to be output. The worst case bandwidth is the same as HEVC.

Since the reference pictures are usually stored in DRAM (dynamic random access memory), the memory bandwidth calculation needs to take the DRAM data access behaviour into account. For the bandwidth estimation, equation (1) is usually used to calculate the average number of pixels that are required for the interpolation of each pixel in the worst case. The M and N are the PU width and height, m and n are width and height of a memory unit of one address in DRAM. If bi-prediction is used, this number should be doubled.

$$P = \frac{\left\lceil \frac{m-1+M+L-1}{m} \right\rceil \times \left\lceil \frac{n-1+N+L-1}{n} \right\rceil \times m \times n}{M \times N} \quad (1)$$

In the above equation, "⌈x⌉" represents a ceiling function corresponding to the smallest integer not less than x.

BRIEF SUMMARY OF THE INVENTION

A method and apparatus of video coding for video data are disclosed. Restricted IntraBC prediction (Intra Block Copy prediction) is determined, where the IntraBC prediction is restricted from using samples in one or more blocks belonging to a selected block group. Video encoding or decoding is applied to the current block using coding modes including the restricted IntraBC prediction. In one example, the selected block group consists of an 8×8 bi-prediction PU, a 4×8 uni-prediction PU, an 8×4 uni-prediction PU, an AMP (asymmetric motion partition) bi-prediction PU from a 16×16 PU, or any combination of them. In another example, the selected block group consists of an 8×8 bi-prediction PU. The restricted IntraBC prediction can be applied to the current block has a non-444 colour format.

The restricted IntraBC prediction may include exception by allowing the restricted IntraBC prediction to use the samples in blocks belonging to the selected block group if one or more conditions are satisfied. For example, the conditions may correspond to the blocks being 8×8 IntraBC coded blocks, the blocks being within a current CTU (coding tree unit) or a left CTU of the current block, or the blocks with at least one of two motion vectors having integer value. In another example, the conditions corresponds to the blocks being 8×8 bi-prediction blocks with at least one of two motion vectors having integer value. In yet another example, the conditions correspond to said one or more blocks being coded with motion vectors all having integer values or being coded using the IntraBC prediction. The conditions may also correspond to the blocks being coded with at least one of motion vector components having integer value.

A method and apparatus of video coding for video data are disclosed. Restricted prediction is determined to disallow or disable selected prediction for one or more selected PU (prediction unit) sizes, PU prediction types or both are disabled or disallowed. Video coding is applied to the current block using coding modes including IntraBC prediction in accordance with the restricted prediction, where the selected prediction corresponds to the IntraBC prediction. In one example, the selected PU sizes, PU prediction types or both corresponds to 8×8 bi-prediction PU. The IntraBC prediction in accordance with the restricted prediction can be applied to the current block has a non-444 colour format.

The selected PU sizes, PU prediction types or both are disabled or disallowed for the restricted prediction except that one or more conditions are determined to be satisfied. For example, the selected PU sizes, PU prediction types or both may correspond to 8×8 bi-prediction PU, while the conditions may correspond to one of two motion vectors of the 8×8 bi-prediction PU having integer value or all of motion vectors of the 8×8 bi-prediction PU having integer value. In other example, the selected PU sizes, PU prediction types or both may correspond to 8×8 bi-prediction PU, and the conditions may correspond to at least one of motion vector components of the 8×8 bi-prediction PU having integer value.

DETAILED DESCRIPTION OF THE INVENTION

Figure 1:
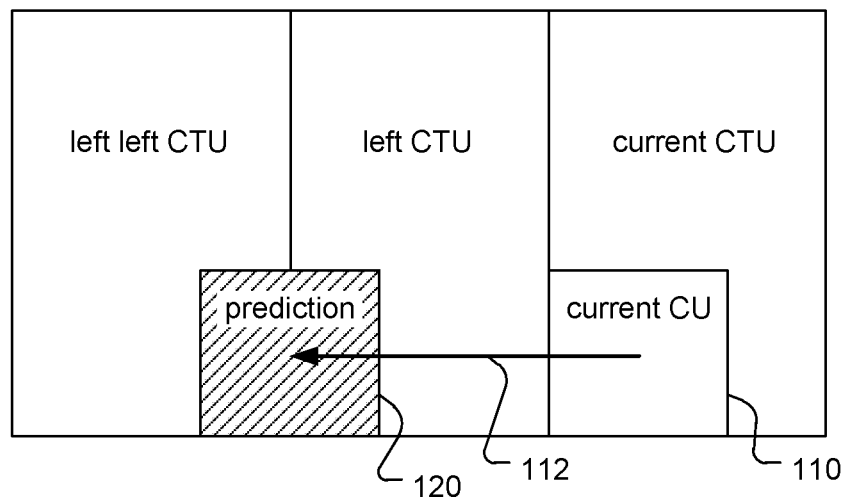
FIG. 1 illustrates an exemplary IntraBC prediction according to HEVC (High Efficiency Video Coding) based Screen Content Coding Test Module Version 4 (SCM-4.0).

The following description is of the best-contemplated mode of carrying out the invention. This description is made for the purpose of illustrating the general principles of the invention and should not be taken in a limiting sense. The scope of the invention is best determined by reference to the appended claims.

Block Size Constraint for Intra Block Copy

According to the formula in equation (1), the worst case bandwidth analysis for different PU size and different memory block size is shown in Table 1. Since the reconstructed pixel data of a CTU is aligned with the memory units in DRAM and no interpolation filter is required, outputting the pre-filter or filtered results of a reconstructed CTU only increases the bandwidth 1 pixel per pixel. The total bandwidth of outputting one filtered CTU (i.e., the "P+output") and the total bandwidth of outputting one filtered CTU and un-filtered CTU ((i.e., the "P+output+un-filtered output") are also shown in Table 1. In Table 1, the bandwidth bottlenecks of HEVC in each (m, n) pairs are marked in bold in column "P+output". As shown in Table 1, the worst case occurs for all 8×8 PU with bi-prediction. For this kind of blocks, if the un-filtered pixels are also output, the worst case bandwidth (as shown in column "P+output+un-filtered output") is larger than the HEVC worst cast bandwidth.

TABLE 1

| (m, n) | M | N | L | Uni-/Bi-Pred | Total P | P + output | P + output + un-filtered output |
|---|---|---|---|---|---|---|---|
| (8, 2) | 8 | 8 | 8 | 2 | 12 | 13 | 14 |
| | 8 | 4 | 8 | 1 | 9 | 10 | 11 |
| | 4 | 8 | 8 | 1 | 12 | 13 | 14 |
| | 8 | 4 | 1 | 1 | 3 | 4 | 5 |
| | 4 | 8 | 1 | 1 | 5 | 6 | 7 |
| | 8 | 8 | 1 | 1 | 2.5 | 3.5 | 4.5 |
| | 16 | 8 | 8 | 2 | 8 | 9 | 10 |
| | 8 | 16 | 8 | 2 | 9 | 10 | 11 |
| | 16 | 16 | 8 | 2 | 6 | 7 | 8 |
| (8, 4) | 8 | 8 | 8 | 2 | 15 | 16 | 17 |
| | 8 | 4 | 8 | 1 | 12 | 13 | 14 |
| | 4 | 8 | 8 | 1 | 15 | 16 | 17 |
| | 8 | 4 | 1 | 1 | 4 | 5 | 6 |
| | 4 | 8 | 1 | 1 | 6 | 7 | 8 |
| | 8 | 8 | 1 | 1 | 3 | 4 | 5 |
| | 16 | 8 | 8 | 2 | 10 | 11 | 12 |
| | 8 | 16 | 8 | 2 | 10.5 | 11.5 | 12.5 |
| | 16 | 16 | 8 | 2 | 7 | 8 | 9 |
| (4, 4) | 8 | 8 | 8 | 2 | 12.5 | 13.5 | 14.5 |
| | 8 | 4 | 8 | 1 | 10 | 11 | 12 |
| | 4 | 8 | 8 | 1 | 10 | 11 | 12 |
| | 8 | 4 | 1 | 1 | 3 | 4 | 5 |
| | 4 | 8 | 1 | 1 | 3 | 4 | 5 |
| | 8 | 8 | 1 | 1 | 2.25 | 3.25 | 4.25 |
| | 16 | 8 | 8 | 2 | 8.75 | 9.75 | 10.75 |
| | 8 | 16 | 8 | 2 | 8.75 | 9.75 | 10.75 |
| | 16 | 16 | 8 | 2 | 6.125 | 7.125 | 8.125 |
| (4, 2) | 8 | 8 | 8 | 2 | 10 | 11 | 12 |
| | 8 | 4 | 8 | 1 | 7.5 | 8.5 | 9.5 |
| | 4 | 8 | 8 | 1 | 8 | 9 | 10 |
| | 8 | 4 | 1 | 1 | 2.25 | 3.25 | 4.25 |
| | 4 | 8 | 1 | 1 | 2.5 | 3.5 | 4.5 |
| | 8 | 8 | 1 | 1 | 1.875 | 2.875 | 3.875 |
| | 16 | 8 | 8 | 2 | 7 | 8 | 9 |
| | 8 | 16 | 8 | 2 | 7.5 | 8.5 | 9.5 |
| | 16 | 16 | 8 | 2 | 5.25 | 6.25 | 7.25 |
| (4, 1) | 8 | 8 | 8 | 2 | 9.375 | 10.375 | 11.375 |
| | 8 | 4 | 8 | 1 | 6.875 | 7.875 | 8.875 |
| | 4 | 8 | 8 | 1 | 7.5 | 8.5 | 9.5 |
| | 8 | 4 | 1 | 1 | 1.5 | 2.5 | 3.5 |
| | 4 | 8 | 1 | 1 | 2 | 3 | 4 |
| | 8 | 8 | 1 | 1 | 1.5 | 2.5 | 3.5 |
| | 16 | 8 | 8 | 2 | 6.5625 | 7.5625 | 8.5625 |
| | 8 | 16 | 8 | 2 | 7.1875 | 8.1875 | 9.1875 |
| | 16 | 16 | 8 | 2 | 5.03125 | 6.03125 | 7.03125 |
| (8, 1) | 8 | 8 | 8 | 2 | 11.25 | 12.25 | 13.25 |
| | 8 | 4 | 8 | 1 | 8.25 | 9.25 | 10.25 |
| | 4 | 8 | 8 | 1 | 11.25 | 12.25 | 13.25 |
| | 8 | 4 | 1 | 1 | 2 | 3 | 4 |
| | 4 | 8 | 1 | 1 | 4 | 5 | 6 |
| | 8 | 8 | 1 | 1 | 2 | 3 | 4 |
| | 16 | 8 | 8 | 2 | 7.5 | 8.5 | 9.5 |
| | 8 | 16 | 8 | 2 | 8.625 | 9.625 | 10.625 |
| | 16 | 16 | 8 | 2 | 5.75 | 6.75 | 7.75 |

In 4:2:0 chroma format, the chroma is considered to be interleaved as recommended in JCTVC-O0007 (Chono, et al., *JCT-VC AHG report: Memory compression*, Joint Collaborative Team on Video Coding (JCT-VC) of ITU-T SG 16 WP 3 and ISO/IEC JTC 1/SC 29/WG 11, 3rd Meeting: Guangzhou, CN, 7-15 Oct. 2010, Document: JCTVC-O0007) and JCTVC-L0440 (François, et al., *AHG7: The performance of extended intra chroma prediction for non 4:2:0 format*, Joint Collaborative Team on Video Coding (JCT-VC) of ITU-T SG 16 WP 3 and ISO/IEC JTC 1/SC 29/WG 11, 12th Meeting: Geneva, CH, 14-23 Jan. 2013, Document: JCTVC-L0440). These methods are used for memory BW analysis. For each pixel within M×N luma block the number of pixels per fetched from the memory for chroma is calculated as follows.

$$P = \frac{\left[\frac{m-2+M+2L-2}{m}\right] \cdot \left[\frac{n-1+\frac{N}{2}+L-1}{n}\right] \cdot m \cdot n}{M \cdot \frac{N}{2}} \quad (2)$$

Embodiment 1: Overcome Worst Case Memory Bandwidth by Restricting IntraBC Reference Block Access In order to overcome the issue of increased worst case memory bandwidth for certain IntraBC cases, the access of the IntraBC reference block is restricted if the IntraBC reference block belongs to a selected block group.

For example, the IntraBC prediction can be restricted from using samples for the following prediction unit (PU) sizes and/or PU types:
1. 4×8 PU and 8×8 bi-predicted PUs;
2. 4×8 PU, 8×4 PU, and 8×8 bi-predicted PUs;
3. 4×8 PU, 8×4 PU, and 8×8 PUs;
4. 4×8 PU, 8×4 PU, 8×8 bi-predicted PU, 16×4 bi-predicted PU, 4×16 bi-predicted PU, 16×12 bi-predicted PU, and 12×16 bi-predicted PU;
5. 4×8 PU, 8×4 PU, and bi-predicted PU;
6. 4×8 PU and bi-predicted PU;
7. bi-predicted PU;
8. 8×8 bi-predicted PU;
9. 4×8 PU;
10. 8×4 PU.

In another example, the IntraBC prediction can be restricted from using samples for coding unit (CU) sizes smaller than a threshold:
11. CU size smaller than 16×16;
12. CU size smaller than 32×32;
13. CU size smaller than 64×64.

In another example, the IntraBC prediction can be restricted from using samples for PU sizes smaller than a threshold:
14. PU size smaller than 16×16;
15. PU size smaller than 32×32;
16. PU size smaller than 64×64.

In another example, the IntraBC prediction can be restricted from using samples for one or more combinations of above conditions:
17. CU size smaller than 16×16 or PU size is 4×16, 12×16, 16×4, or 16×12;
18. CU size smaller than 16×16 or 16×4 bi-predicted PU, 4×16 bi-predicted PU, 16×12 bi-predicted PU, and 12×16 bi-predicted PU;
19. CU size smaller than 16×16 or the CU has 16×4 bi-predicted PU, 4×16 bi-predicted PU, 16×12 bi-predicted PU, and 12×16 bi-predicted PU;
20. CU size smaller than 16×16 or the CU has 16×4 bi-predicted PU and 16×12 bi-predicted PU, or has 4×16 bi-predicted and 12×16 bi-predicted PU;
21. CU size smaller than 16×16 and bi-predicted PU.

In another example, the IntraBC prediction can be restricted from using samples for specific CU/PU partitions, such as:
22. CU has 16×4 bi-predicted PU, 4×16 bi-predicted PU, 16×12 bi-predicted PU, and 12×16 bi-predicted PU;

23. CU has 16×4 bi-predicted PU and 16×12 bi-predicted PU, or has 4×16 bi-predicted PU and 12×16 bi-predicted PU.

In another example, the restricted IntraBC prediction is subject to the following exceptions to allow the IntraBC prediction to use samples of the IntraBC reference block belonging to the selected block group if one or more of the following conditions related to motion vector resolution are satisfied:

24. samples coded by integer MV;
25. samples that one of the MV_x or MV_y is integer MV;
26. samples that one set of the (MV_x, MV_y) are both integer MV.

In another example, the restricted IntraBC prediction is subject to the following exceptions to allow the IntraBC prediction to use samples of the IntraBC reference block belonging to the selected block group if one or more of the following conditions related to motion vector resolution are satisfied:

27. the IntraBC prediction from the samples coded by Intra block copy;
28. the IntraBC prediction from the samples coded without using interpolation;
29. the IntraBC prediction from the samples that one of the reference frames is from the reconstructed current picture, which is used for Intra block copy;
30. the IntraBC prediction when the use_integer_MV_flag is 1 in the current slice header;
31. the IntraBC prediction from the samples in the slice that the use_integer_MV_flag is 1.

One or more of the above cases can be applied together in some coding profiles or/and in some Chroma formats. For example, if the conditions 2, 22, 27 and 30 are used, the samples in 8×4/4×8 uni-pred PU (uni-predicted PU), or in 8×8 bi-pred PU (bi-predicted PU), or in the CU has 16×4 bi-predicted PU and 16×12 bi-predicted PU, or has 4×16 bi-predicted PU and 12×16 bi-predicted PU are not allowed to be predicted by IntraBC, except that if one of reference frames of this sample is from the reconstructed current picture or the use_integer_MV_flag is 1 in the slice header that the sample belongs to.

For the above cases, a picture can be divided into multiple N×N blocks, where N can be 4, 8, 16, 32, 64, or the N×N block can be the size of CTU/CTB. For these blocks, encoder can use a flag to indicate whether the block can be referred by Intra block copy mode. This flag can be signalled in bitstream or inferred. For example, for condition 8, the N can be 16, and this flag is to indicate whether this 16×16 block has a CU smaller than 16×16. If this flag is false, this block cannot be referred by Intra block copy mode.

In another example, for cases 18, if a 16×16 block has a CU smaller than 16×16 or has 16×4 bi-predicted PU, 4×16 bi-predicted PU, 16×12 bi-predicted PU, and 12×16 bi-predicted PU, this 16×16 block cannot be referred by Intra block copy mode.

In another example, for cases 18, if a 16×16 block has a CU smaller than 16×16, or has 16×4 bi-predicted PU and 16×12 bi-predicted PU, or 4×16 bi-predicted PU and 12×16 bi-predicted PU, this 16×16 block cannot be referred by intra block copy mode.

In another example, the block size can be 8×8, and conditions 2, 22, 28 and 31 are used. In yet another example, conditions 2, 28 and 31 are used.

In another example, the block size can be 16×16, and conditions 2, 22, 28 and 31 are used.

In another example, the constrained Intra prediction can be applied with this N×N block constraint. For example, if constrained Intra prediction is applied and one of the sample in this N×N block is coded with normal Inter mode (i.e., reference samples not from current picture), this block is marked as invalid for Intra block copy.

The above conditions can be combined with other constraints. For example, for a certain region, all samples in this region can be used for Intra block copy mode. For the sample outside this region, one or more of the above constraints (or/and the N×N block flag/constraint) can be applied. The region can be the current CTU, or the current CTU plus left M CTUs where M is an integer, such as 1 or 2.

In another example, if the samples are determined as invalid according to the above constraints and Intra block copy constraints (e.g. outside of current picture, overlapped with current PU/CU, inter-coded pixels when constraint intra prediction is applied), the invalid samples are treated as a default value, such 128 or (1<<(bit_depth−1)).

In another example, the CTU flag in JCTVC-T0045 and JCTVC-T0051 can be inferred as 0 (i.e., always enabling deblocking and SAO) when the current slice is P-slice or I-slice.

Embodiment 2: Overcome Worst Case Memory Bandwidth by Disabling or Disallowing Some Modes in Some Profiles or Chroma Formats According to this embodiment, some modes are disabled or disallowed to use selected prediction in order to reduce the worst case bandwidth for some profiles or some Chroma formats. The selected prediction may correspond to the IntraBC prediction.

For example, the block corresponds to one of the following selected PU sizes and/or PU prediction types can be disabled or disallowed for selected prediction:

1. 4×8 PU and 8×8 bi-predicted PU;
2. 4×8 PU, 8×4 PU, and 8×8 bi-predicted PU;
3. 4×8 PU, 8×4 PU, and 8×8 PU;
4. 4×8 PU, 8×4 PU, 8×8 bi-predicted PU, 16×4 bi-predicted PU, 4×16 bi-predicted PU, 16×12 bi-predicted PU, and 12×16 bi-predicted PU;
5. 4×8 PU, 8×4 PU, 8×8 bi-predicted PU, 16×4 bi-predicted PU, 4×16 bi-predicted PU, 16×12 bi-predicted PU, and 12×16 bi-predicted PU;
6. 4×8 PU, 8×8 bi-predicted PU, 4×16 bi-predicted PU, and 12×16 bi-predicted PU;
7. bi-predicted PU;
8. 8×8 bi-predicted PU;
9. 4×8 PU;
10. 8×4 PU;
11. 4×8 PU and bi-predicted PU.

In another example, the block corresponds to one of the following selected CUs with sizes smaller than a threshold can be disabled or disallowed for selected prediction:

12. CU that size smaller than 16×16;
13. CU that size smaller than 32×32;
14. CU that size smaller than 64×64.

In another example, the block corresponds to one of the following selected PUs with sizes smaller than a threshold can be disabled or disallowed for selected prediction:

15. PU size smaller than 16×16;
16. PU that smaller than 32×32;
17. PU that smaller than 64×64;

In another example, the block for one or more combinations of above CU and PU cases can be disabled or disallowed for selected prediction:

18. Disable CU that size smaller than 16×16 and bi-predicted PU;
19. Disable CU that has 16×4 bi-predicted PU, 4×16 bi-predicted PU, 16×12 bi-predicted PU, and 12×16 bi-predicted PU;
20. Disable CU that has 16×4 bi-predicted PU and 16×12 bi-predicted PU, or has 4×16 bi-predicted PU and 12×16 bi-predicted PU;
21. Disable CU that size smaller than 16×16 or PU that size is 4×16, 12×16, 16×4, or 16×12;
22. Disable CU that size smaller than 16×16 or 16×4 bi-predicted PU, 4×16 bi-predicted PU, 16×12 bi-predicted PU, and 12×16 bi-predicted PU;
23. Disable CU that size smaller than 16×16 or the CU has 16×4 bi-predicted PU, 4×16 bi-predicted PU, 16×12 bi-predicted PU, and 12×16 bi-predicted PU;
24. Disable CU that size smaller than 16×16 or the CU has 16×4 bi-predicted PU and 16×12 bi-predicted PU, or has 4×16 bi-predicted PU and 12×16 bi-predicted PU.

In another example, the block for the selected PU sizes and/or PU type and MV resolution can be disabled or disallowed for selected prediction:

25. Disable/disallow 4×8 PU with fractional MV and 8×8 bi-predicted PU;
26. Disable/disallow 4×8 PU with fractional MV, 8×4 PU with fractional MV, and 8×8 bi-predicted PU;
27. Disable/disallow 4×8 PU with fractional MV, 8×4 PU with fractional MV, 8×8 bi-predicted PU, 16×4 bi-predicted PU with fractional MV, 4×16 bi-predicted PU with fractional MV, 16×12 bi-predicted PU with fractional MV, and 12×16 bi-predicted PU with fractional MV;
28. Disable/disallow 4×8 PU with fractional MV, 8×8 bi-predicted PU, 4×16 bi-predicted PU with fractional MV, and 12×16 bi-predicted PU with fractional MV;
29. Disable/disallow 4×N PU with fractional MV and 8×8 bi-predicted PU, N can be 8 and 16;
30. Disable/disallow 4×8 PU with fractional MV-x and fractional MV-y and 8×8 bi-predicted PU.

In another example, disabling or disallowing the block mode is subject to one or more exceptions to allow the IntraBC prediction if one or more conditions related to PU sizes and/or PU type and MV resolution are satisfied:

31. Allowing the PU that coded by integer MV;
32. Allowing the PU that one of the MV_x or MV_y is integer MV;
33. Allowing the PU that one set of the (MV_x, MV_y) are both integer MV;
34. Allowing the 4×8 PU with fractional MV if the other 4×8 PU in the same CU is coded by integer MV or coded by intra block copy;
35. Allowing the PU that MV_y is integer MV;
36. Allowing the PU that MV_y of one list is integer MV;
37. Allowing the PU that MV_x is integer MV;
38. Allowing the PU that MV_x of one list is integer MV;
39. Allowing the bi-perdition PU that the MVs of two lists are the same and the two reference pictures are the same picture.

In another example, disabling or disallowing the block mode is subject to one or more exceptions to allow the IntraBC prediction if one or more following conditions:

40. Allowing the PU that one of the reference frames is from the reconstructed current picture, which is used for Intra block copy;
41. Allowing the PU when the use_integer_MV_flag is 1 in the current slice header;
42. Allowing the PU in the slice that the use_integer_MV_flag is 1;
43. Allowing the PU that coded by Intra block copy;
44. Allowing the PU that coded without using interpolation.

One or more of these constraints can be applied together in some profiles or/and in some Chroma formats, such as a non-444 format or a 420 format. For example, if the items 9 and 31 are used, the 4×8 PU with fractional MV (fractional MV_x or fractional MV_y) is disallowed in the 420 format. In another example, if the items 9 and 32 are used, the 4×8 PU with both fractional MV_x and fractional MV_y are disallowed in the 420 format.

In another example, if the items 9 and 35 are used, the 4×8 PU with fractional MV_y is disallowed in the 420 format. In another example, if the items 8 and 36 are used, the 8×8 bi-prediction PU with fractional L0 MV_y and fractional L1 MV_y is disallowed in the 420 format.

In yet another example, if the items 8 and 33 are used, the 8×8 bi-prediction PU is not allowed. However, the 8×8 bi-prediction PU with one set of integer MV_x and integer MV_y is allowed.

In yet another example, if the item 8, 33 and 39 are used, the 8×8 bi-prediction PU is not allowed, but the 8×8 bi-prediction PU with one set of integer MV_x and integer MV_y is allowed, or the 8×8 bi-prediction PU with the same L0 MV and L1 MV and the same POC (picture order count) for two reference pictures is allowed.

In yet another example, if the item 8, 33 and 39 are used, the 8×8 bi-prediction PU is not allowed for the selected prediction, but the 8×8 bi-prediction PU with all integer MV_x and integer MV_y is allowed, or the 8×8 bi-prediction PU with the same L0 MV and L1 MV and the same POC (picture order count) for two reference pictures is allowed.

In yet another example, if the item 8, 35 and 39 are used, the 8×8 bi-prediction PU with integer L0 MV_y or integer L1 MV_y is allowed, or 8×8 bi-prediction PU with the same L0 MV and L1 MV and the same POC (picture order count) for two reference pictures is allowed.

These constraints/conditions can be applied when IntraBC is used, which is when pps_curr_pic_ref_enabled_flag is 1, CurrPicInList0Flag is 1, or CurrPicInList1Flag is 1.

In the above embodiment, these constraints/conditions can be applied when using some chroma formats, such as the 420, 444 or 422 format. For example, the following text is specified for item 9 and 31.

When inter_pred_idc[x0][y0] is equal to 1, nPbW is equal to 4 (i.e., PU width=4), nPbH is equal to 8 (i.e., PU height=8), and either of CurrPicInList0Flag and CurrPicInList1Flag is equal to 1, and one of the following conditions, the variable FourbyEightUniPredFractionalMvInUseforCurrPic is set equal to 1. The variable indicates whether the 4×8 uni-prediction PU with fractional MV is allowed to IntraBC mode. The following four conditions imply a reference picture in L0 or L1 exists and the MV_x or MV_y is fractional.

RefIdxL0[x0][y0] is not −1 and MvL0[x0][y0][0] & 0x03 is not 0;
RefIdxL0[x0][y0] is not −1 and MvL0[x0][y0][1] & 0x03 is not 0;
RefIdxL1[x0][y0] is not −1 and MvL1[x0][y0][0] & 0x03 is not 0;
RefIdxL1[x0][y0] is not −1 and MvL1[x0][y0][1] & 0x03 is not 0.

Where the MvLx[x0][y0][0] is the x-component of MvLx[x0][y0] and the MvLx[x0][y0][1] is the y-component of MvLx[x0][y0].

Bitstreams conforming to the screen content coding extensions profiles shall obey the following constraints:

When chroma_format_idc is less than 3, the value of FourbyEightUniPredFractionalMvInUseforCurrPic shall be equal to 0.

In another example, the following text is specified for item 9 and 35.

When inter_pred_idc[x0][y0] is equal to 1, nPbW is equal to 4, nPbH is equal to 8, and either of CurrPicInList0Flag and CurrPicInList1Flag is equal to 1, and one of the following conditions is true, the variable FourbyEightUniPredFractionalMvyInUseforCurrPic is set equal to 1.

RefIdxL0[x0][y0] is not −1 and MvL0[x0][y0][1] & 0x03 is not 0;

RefIdxL1[x0][y0] is not −1 and MvL1[x0][y0][1] & 0x03 is not 0.

Bitstreams conforming to the screen content coding extensions profiles shall obey the following constraints:

When chroma_format_idc is less than 3, the value of FourbyEightUniPredFractionalMvyInUseforCurrPic shall be equal to 0.

For example, the following text is specified for item 9 and 31.

When inter_pred_idc[x0][y0] is equal to 1, nPbW is equal to 4, nPbH is equal to 8, and either of CurrPicInList0Flag and CurrPicInListFlag is equal to 1, and one of the following conditions is true, the variable FourbyEightUniPredFractionalMvInUseforCurrPic is set equal to 1.

RefIdxL0[x0][y0] is not −1 and MvL0[x0][y0][0] & 0x03 is not 0;

RefIdxL0[x0][y0] is not −1 and MvL0[x0][y0][1] & 0x03 is not 0;

RefIdxL1[x0][y0] is not −1 and MvL1[x0][y0][0] & 0x03 is not 0;

RefIdxL1[x0][y0] is not −1 and MvL1[x0][y0][1] & 0x03 is not 0.

Bitstreams conforming to the screen content coding extensions profiles shall obey the following constraints:

When chroma_format_idc is less than 3, the value of FourbyEightUniPredFractionalMvInUseforCurrPic shall be equal to 0.

Another example, the following text is specified for item 9 and 35.

When inter_pred_idc[x0][y0] is equal to 1, nPbW is equal to 4, nPbH is equal to 8, and either of CurrPicInList0Flag and CurrPicInListFlag is equal to 1, and one of the following condition is true, the variable FourbyEightUniPredFractionalMvyInUseforCurrPic is set equal to 1.

RefIdxL0[x0][y0] is not −1 and MvL0[x0][y0][1] & 0x03 is not 0

RefIdxL1[x0][y0] is not −1 and MvL1[x0][y0][1] & 0x03 is not 0

Bitstreams conforming to the screen content coding extensions profiles shall obey the following constraints:

When chroma_format_idc is less than 3, the value of FourbyEightUniPredFractionalMvyInUseforCurrPic shall be equal to 0.

In another embodiment, these constraints are applied when use_integer_MV_flag is 1. In yet another embodiment, these constraints can be applied by using a requirement of bitstream conformance or a normative change. For example, a bitstream conformance is required that the 4×8 PU with fractional MV (one of the MVx and MVy is fractional MV) is disallowed in the 420 format when the pps_curr_pic_ref_enabled_flag is 1, in another example, bitstream conformance is required that the 4×8 PU with both of the fractional MV_x and fractional MV_y is disallowed in 420 the format when the pps_curr_pic_ref_enabled_flag is 1.

In yet another embodiment, whether these constraints can be applied depends on an enable syntax in the SPS (sequence parameter set), PPS, or slice header. e.g.:

if (pps_curr_pic_ref_enabled_flag==1 && chroma_format_idc<3 && use_integer_MV_flag==1)
  disable_8×8_bi_4×8_uni_frac_MV_inter_flag;

or if (pps_curr_pic_ref_enabled_flag==1 && chroma_format_idc<3)
  disable_8×8_bi_4×8_uni_frac_MV_inter_flag For example, a syntax disable_8×8_bi_4×8_uni_frac_MV_inter_flag can be added in PPS if pps_curr_pic_ref_enabled_flag is equal to 1 and chroma_forma_idc<3. If the disable_8×8_bi_4×8_uni_frac_MV_inter_flag is equal to 1, a requirement of bitstream conformance is needed. In this case, when curr_pic_as_ref_enabled_flag is equal to 1 and chroma_format_idc<3, inter_pred_idc[x][y] shall not be equal to 2 for 8×4 PU (i.e., nPbW=8 and nPbH=4) or 4×8 PU (i.e., nPbW=4 and nPbH=8) when the MV_x and Mv_y of the current PU are not integer MV or one of the MV_x and MV_y of the current PU is not integer MV.

The IntraBC enable flag (i.e., curr_pic_as_ref_enabled) can be signalled in the PPS or slice header. So the IntraBC can be enabled in some pictures and disabled in some pictures. The proposed constraints are applied when IntraBC is enabled.

The restricted IntraBC prediction can be applied in non-444 video. For each 8×8 CU with two 4×8 PUs, one PU can have fractional MVs (i.e., "fractional MV_x and fractional MV_y" or "fractional MVx or fractional MVy") if the other PU is coded by integer MV or coded by Intra block copy.

In an example of embodiment 2, if the constraint 29 is applied, a requirement of bitstream conformance is needed. In this case, when curr_pic_as_ref_enabled_flag is equal to 1, inter_pred_idc[x][y] shall not be equal to 2 when nPbW=8 and nPbH=8.

In another example, when curr_pic_as_ref_enabled_flag is equal to 1 and when nPbW=8 and nPbH=8, the inter_pred_idc[x][y]=2 is removed from the codeword.

In one example, in method-2, if the constraint 39 and 30 are applied, a requirement of bitstream conformance is needed that when curr_pic_as_ref_enabled_flag is equal to 1 and chroma_format_idc<3, inter_pred_idc[x][y] shall not be equal to 2 for 8×8 PU (i.e., nPbW=8 and nPbH=8) or 4×8 PU (i.e., nPbW=4 and nPbH=8).

Figure 2:
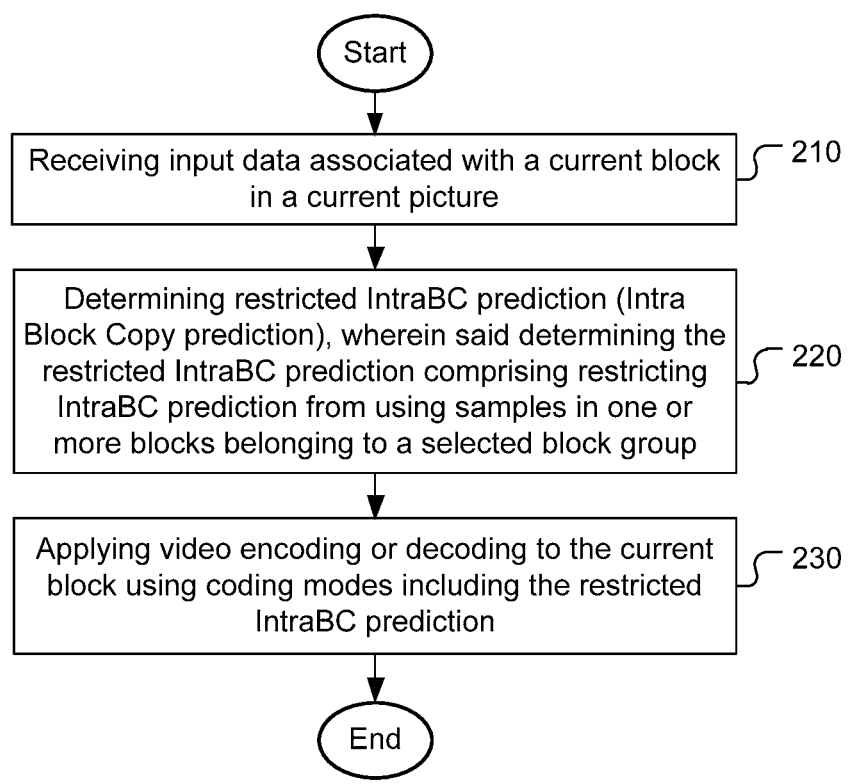
FIG. 2 illustrates an exemplary flowchart of IntraBC coding according to an embodiment of the present invention, where the IntraBC prediction is restricted from using samples belonging to one or more selected block sizes, one or more prediction types or both.
Figure 3:
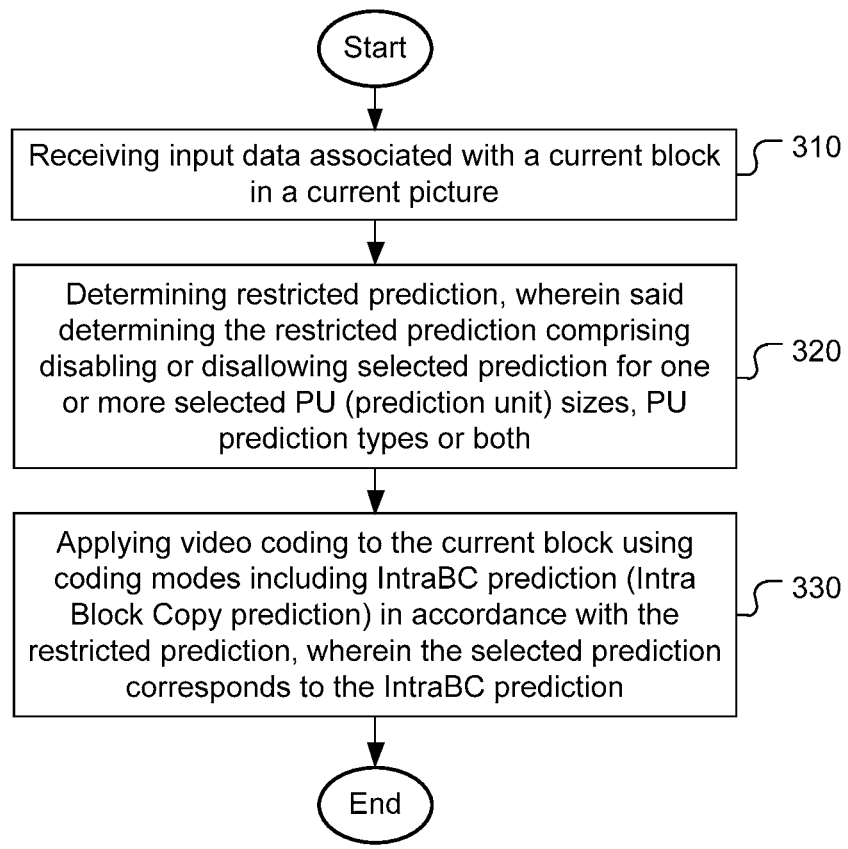
FIG. 3 illustrates an exemplary flowchart of video coding according to an embodiment of the present invention, where one or more selected PU (prediction unit) sizes, PU prediction types or both are disabled or disallowed for selected prediction.

FIG. 2 illustrates an exemplary flowchart of IntraBC coding according to an embodiment of the present invention, where the IntraBC prediction is restricted from using samples belonging to one or more selected block sizes, one or more prediction types or both. The system receives input data associated with a current block in a current picture in step 210. For encoding, the input data corresponds to data associated with the current block to be encoded. For decoding, the input data corresponds to coded bitstream including the current block. Restricted IntraBC prediction is determined by restricting IntraBC prediction from using samples in one or more blocks belonging to a selected block group in step 220. Video encoding or decoding is applied to the current block using coding modes including the restricted IntraBC prediction in step 230.

FIG. 2 illustrates an exemplary flowchart of video coding according to an embodiment of the present invention, where one or more selected PU sizes, PU prediction types or both are disabled or disallowed. The system receives input data associated with a current block in a current picture in step 310. For encoding, the input data corresponds to data associated with the current block to be encoded. For decoding, the input data corresponds to coded bitstream including the current block. The restricted prediction is determined by disabling or disallowing selected prediction for one or more selected PU sizes, PU prediction types or both in step 320. Video coding is applied to the current block using coding modes including the IntraBC prediction in accordance with the restricted prediction in step 330, wherein the selected prediction corresponds to the IntraBC prediction.

In one embodiment, disabling the selected PU sizes and/or PU prediction types implies that there is no syntax element related to the disabled selected PU sizes and/or PU prediction types. On the other hand, disallowing the selected PU sizes and/or PU prediction types implies that the encoder may or may not use the selected PU sizes and/or PU prediction, however, the decoder can ensure that the selected PU sizes and/or PU prediction will not be used for decoding the current block.

The flowchart shown above is intended to illustrate examples of restricted IntraBC coding in a video encoder or a decoder incorporating embodiments of the present invention. A person skilled in the art may modify each step, re-arranges the steps, split a step, or combine the steps to practice the present invention without departing from the spirit of the present invention.

The above description is presented to enable a person of ordinary skill in the art to practice the present invention as provided in the context of a particular application and its requirement. Various modifications to the described embodiments will be apparent to those with skill in the art, and the general principles defined herein may be applied to other embodiments. Therefore, the present invention is not intended to be limited to the particular embodiments shown and described, but is to be accorded the widest scope consistent with the principles and novel features herein disclosed. In the above detailed description, various specific details are illustrated in order to provide a thorough understanding of the present invention. Nevertheless, it will be understood by those skilled in the art that the present invention may be practiced.

Embodiment of the present invention as described above may be implemented in various hardware, software codes, or a combination of both. For example, an embodiment of the present invention can be one or more electronic circuits integrated into a video compression chip or program code integrated into video compression software to perform the processing described herein. An embodiment of the present invention may also be program code to be executed on a Digital Signal Processor (DSP) to perform the processing described herein. The invention may also involve a number of functions to be performed by a computer processor, a digital signal processor, a microprocessor, or field programmable gate array (FPGA). These processors can be configured to perform particular tasks according to the invention, by executing machine-readable software code or firmware code that defines the particular methods embodied by the invention. The software code or firmware code may be developed in different programming languages and different formats or styles. The software code may also be compiled for different target platforms. However, different code formats, styles and languages of software codes and other means of configuring code to perform the tasks in accordance with the invention will not depart from the spirit and scope of the invention.

The invention may be embodied in other specific forms without departing from its spirit or essential characteristics. The described examples are to be considered in all respects only as illustrative and not restrictive. The scope of the invention is therefore, indicated by the appended claims rather than by the foregoing description. All changes which come within the meaning and range of equivalency of the claims are to be embraced within their scope.

The invention claimed is:

1. A method of video coding for video data, comprising:
receiving input data associated with a current block in a current picture;
determining restricted prediction based on whether IntraBC prediction (Intra Block Copy prediction) is included in a plurality of candidate coding modes, wherein said determining the restricted prediction comprising disabling or disallowing selected prediction for one or more selected PU (prediction unit) sizes, PU prediction types or both; and
applying video coding to the current block using the candidate coding modes including IntraBC prediction (Intra Block Copy prediction) in accordance with the restricted prediction.

2. The method of claim 1, wherein said disabling or disallowing prediction for said one or more selected PU sizes, PU prediction types or both is further based on one or more conditions.

3. The method of claim 1, wherein said determining the restricted prediction is disabled when said one or more selected PU sizes, PU prediction types or both corresponds to 8×8 bi-prediction PU and at least one of two motion vectors of said 8×8 bi-prediction PU having integer values.

4. The method of claim 1, wherein said determining the restricted prediction is disabled when said one or more selected PU sizes, PU prediction types or both corresponds to 8×8 bi-prediction PU and motion vector(s) of the 8×8 bi-prediction PU all having integer values.

5. The method of claim 1, wherein said determining the restricted prediction is disabled when said one or more selected PU sizes, PU prediction types or both corresponds to 8×8 bi-prediction PU and at least one of motion vector components having integer value.

6. The method of claim 1, wherein the current block has a non-444 colour format.

7. The method of claim 1, wherein said disabling or disallowing prediction for said one or more selected PU sizes, PU prediction types or both is subjected to one or more exceptions if one or more conditions are satisfied.

8. The method of claim 7, wherein said one or more selected PU sizes, PU prediction types or both corresponds to 8×8 bi-prediction PU and said one or more conditions correspond to at least one of two motion vectors of said 8×8 bi-prediction PU having integer values.

9. The method of claim 7, wherein said one or more selected PU sizes, PU prediction types or both corresponds to 8×8 bi-prediction PU and said one or more conditions correspond to motion vector(s) of the 8×8 bi-prediction PU all having integer values.

10. The method of claim 7, wherein said one or more selected PU sizes, PU prediction types or both corresponds to 8×8 bi-prediction PU and said one or more conditions correspond to at least one of motion vector components having integer value.

11. An apparatus of video coding for video data, comprising one or more electronic circuits arranged to:
- receiving input data associated with a current block in a current picture;
- determining restricted prediction based on whether IntraBC prediction (Intra Block Copy prediction) is included in a plurality of candidate coding modes, wherein said determining the restricted prediction comprising disabling or disallowing selected prediction for one or more selected PU (prediction unit) sizes, PU prediction types or both; and
- applying video coding to the current block using the candidate coding modes including IntraBC prediction (Intra Block Copy prediction) in accordance with the restricted prediction.

* * * * *